Dec. 31, 1940. H. MARTIN 2,226,777

MEANS FOR FASTENING MACHINE ELEMENTS ON A SHAFT

Filed Oct. 19, 1938

Inventor:
Hans Martin,
By Potter, Pierce & Scheffler,
Attorneys

Patented Dec. 31, 1940

2,226,777

UNITED STATES PATENT OFFICE 2,226,777

MEANS FOR FASTENING MACHINE ELEMENTS ON A SHAFT

Hans Martin, Erfurt, Germany, assignor to Olympia Buromaschinenfabrik A. G., Erfurt, Germany, a corporation of Germany Application October 19, 1938, Serial No. 235,913
In Germany October 26, 1937

5 Claims. (Cl. 287—52)

The present invention pertains to improvements in devices and arrangements for securing in spaced relation upon a single shaft or axle a number of closely associated machine elements, for example gears, cams, cranks, levers, etc., the invention being particularly adapted for application to machine elements made of heat-sensitive materials. Furthermore, the invention has particular application in fine precision machines, especially in counters, registers and similar mechanisms forming parts of modern registering and business machines.

Prior devices and arrangements of a somewhat similar nature are known. In some of these known arrangements discs are used, which discs are mounted firmly on the shaft beside and between the machine elements. For example, there have been employed untempered metal clips or rings having open sides to permit their being slipped over the shaft, which open sides are then pressed together to hold the clips or rings in their intended positions. In order to assemble such clips or rings upon the shaft and to remove them for adjustments of the machine, it is necessary to use special tools requiring considerable skill in their manipulation. Discs of spring tempered material have also been employed in conjunction with depressions on the shaft, the discs being designed to be pressed resiliently into such depressions and to be held in position therein by their spring action. However, these discs also can be assembled on the shaft and removed only by the exercise of considerable skill on the part of the assembler and with the aid of special tools. A further disadvantage of the devices of the above prior art is that in using such special tools, not only are the discs themselves easily distorted and rendered useless for re-employment, but also the machine elements being assembled are liable to become damaged. In the case of the spring discs there is the further danger that the discs will break and their position upon the shaft become insecure.

Moreover, for securing a single machine element upon a shaft a face disc has previously been proposed which disc is connected on its rear side with the machine element by the use of additional securing means.

One object of the present invention is to provide separating and securing means of this nature using, in contrast to such prior arrangements, simple separating discs having no spring action, the assembling and removing of which require no special or auxiliary tools, and which may be used without any special securing means.

By the present invention, the above purposes are accomplished by employing discs which are to be inserted between the machine elements in depressions provided on the shaft, the discs serving as separating members and being secured in their desired position by corresponding recesses or seats formed in the adjacent machine elements.

According to one form of the invention, means are provided with such a separating disc for coupling a machine element to the shaft for rotation therewith, such means including a projection to be engaged by the disc itself.

Other objects of the present invention and its operation, advantages, etc. will appear from the following detailed description, and reference to the accompanying drawing.

In the drawing two conventional forms are illustrated:

Figure 1:
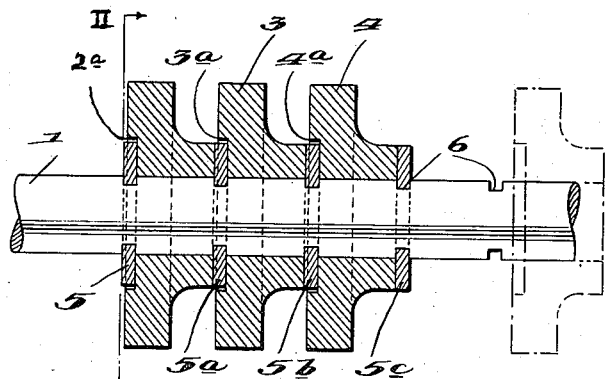
Fig. 1 is a vertical cross-sectional view, taken on the line I—I of Fig. 2 in the direction of the arrows, and illustrates a horizontal shaft with a number of machine elements mounted thereon in accordance with the present invention.

In the drawing, the numeral 1 indicates a shaft upon which are mounted a number of adjacent machine elements 2, 3, and 4. These machine elements may be gears, lever hubs, cranks, cams or similar parts. Spacing and securing discs 5, 5a, 5b, 5c are positioned adjacent each of the machine elements. Each of the discs is provided with a radial slot 10 adapted for engagement with milled out depressions or grooves 6 arranged at suitable intervals on the shaft 1. The hub of each of the elements 2, 3, and 4 has an annular recess 2a, 3a, 4a, formed on one side thereof, the diameter of these recesses being slightly greater than the diameter of the separating discs, and their depth being slightly less than the thickness of the discs. Consequently when the machine elements 2, 3, and 4 are assembled with the discs upon the shaft as shown, they engage and hold the discs 5, 5a, and 5b thereon.

Figure 2:
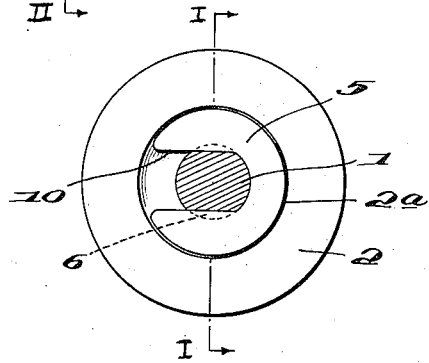
Fig. 2 is a cross-sectional view taken on the line II—II of Fig. 1 in the direction of the arrows.

In assembling the elements upon the shaft as shown in Figs. 1 and 2, separating disc 5 may be first pushed laterally upon the shaft into a groove 6 near one end of the shaft. From the other end of the shaft a gear or other machine element 2 is then slid axially along the shaft, the recessed side of the element facing the disc 5. Element 2 is slid into position as shown so that it engages disc 5, recess 2a encompassing and securing the disc. Next the second disc 5a is placed upon the shaft, thus securing the element 2 against axial movement. In a similar manner element 3, disc 5b, element 4 and disc 5c are successively assembled upon the shaft. Each additional element when positioned as above upon the shaft secures by means of its recess the preceding separating disc, and in turn the element is secured against axial movement by the succeeding separating disc. The final element indicated by dot and dash lines in Fig. 1 secures the last disc 5c in position. This last element is secured in final position by some suitable means such as a ring or the like, not shown.

It will be seen that according to the above arrangement the machine elements 2, 3, and 4 may be relatively rotatable with respect to the discs 5, 5a, 5b, and 5c.

Figure 3:
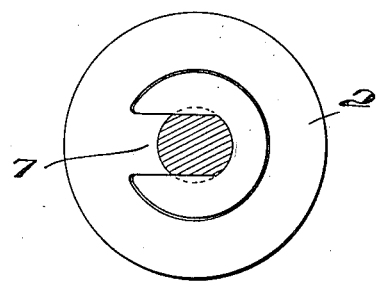
Fig. 3 is a view similar to Fig. 2, but illustrating an embodiment of the invention in which the machine element is coupled to the shaft for rotation therewith.

When it is desired to secure the machine elements for rotation with the shaft, the separating discs and machine elements may be provided with suitably engaging projections and recesses. However, this result is preferably accomplished by means of the embodiment of the present invention shown in Fig. 3. In this form, the recesses 2a, 3a, and 4a of elements 2, 3, and 4, respectively, are not completely circular as shown in Figs. 1 and 2, but are provided with or shaped to provide a lug 7 which, on assembly, will project within the recess of the corresponding disc. This lug will, of course, have as its thickness the depth of the annular recess, and is preferably formed of a width slightly less than that of the recess or slot in the separating disc. When the discs and elements are now assembled, as previously described, the lugs 7 will be engaged by the discs adjacent thereto and the two moved rotatably together. In assembling these parts, which is otherwise done in the manner previously described in connection with Figs. 1 and 2, care must be taken to see that the lug 7 of each element correctly engages the slot in the corresponding separating disc.

The discs employed in my invention may be quite simple in construction, since they need not be flexed or otherwise stressed in their application, nor need they be tempered after manufacture. Furthermore, the assembling operation can be performed in much shorter time since, as previously indicated, special tools and skill are not required.

Further modifications will occur to those skilled in the art, and it is not intended, therefore, that the present invention be limited to the precise forms and applications described herein, but only within the scope of the appended claims.

I claim:

1. In combination a shaft, a radially slotted disc removably engaging said shaft with the plane of the disc substantially perpendicular to the axis of the shaft and with a portion of the wall of the disc bordering the slot therein extending into a groove in the surface of the shaft, a portion at least of the bottom of said groove being rectilinear transversely of the shaft and engaging a corresponding rectilinear portion of the disc, and machine elements having an opening fitting said shaft and disposed thereon with said disc between them, one of said machine elements having a recess in one face thereof of such size and shape as to receive the exposed portion of said disc, said recess being less in depth than the thickness of said disc 2. The combination as defined in claim 1 in which the sides of the slot in the disc are rectilinear and parallel and spaced apart a distance less than the diameter of the shaft and engage corresponding rectilinear surfaces on the shaft.

3. In combination a cylindrical shaft having oppositely disposed grooves extending perpendicularly to the axis of the shaft, the bottoms of said grooves being substantially rectilinear and parallel, a radially slotted disc of larger diameter than said shaft, opposite edges of the slot in said disc being spaced to slide into said grooves with the periphery of the disc concentric with the shaft, machine elements each having an opening fitting said shaft, said elements being disposed on said shaft on opposite sides of and abutting said disc and one of said elements having a substantially circular recess in one side thereof adapted to receive the protruding portion of said disc.

4. In combination a cylindrical shaft having a groove therein extending perpendicular to the axis of the shaft, a portion at least of the bottom of said groove being nonconcentric with the axis of the shaft, a radially slotted disc adapted to slide onto said shaft with a portion thereof fitting into said groove, the edge of the slot in said disc being formed to fit said nonconcentric bottom wall portion of said groove, machine elements mounted on said shaft on opposite sides of and abutting said disc, one of said elements having a recess in one face thereof adapted to receive the portion of said disc which protrudes from said groove.

5. In combination a cylindrical shaft having a groove therein extending perpendicular to the axis of the shaft, a portion at least of the bottom of said groove being nonconcentric with the axis of the shaft, a radially slotted disc adapted to slide onto said shaft with a portion thereof fitting into said groove, the edge of the slot in said disc being formed to fit said nonconcentric bottom wall portion of said groove, machine elements mounted on said shaft on opposite sides of and abutting said disc, one of said elements having a recess in one face thereof adapted to receive the portion of said disc which protrudes from said groove, a portion at least of the boundary of the exposed portion of said disc when in place in the groove in the shaft is nonconcentric with the center of the shaft and engages a correspondingly shaped portion of the wall of the recess in one of the machine elements to prevent relative rotary movement of the machine element and the shaft.

HANS MARTIN.